(No Model.) 3 Sheets—Sheet 1.
L. FINGER.
ALARM FOR DETECTING DEFECTS IN INSULATING CONDUCTORS.
No. 257,683. Patented May 9, 1882.
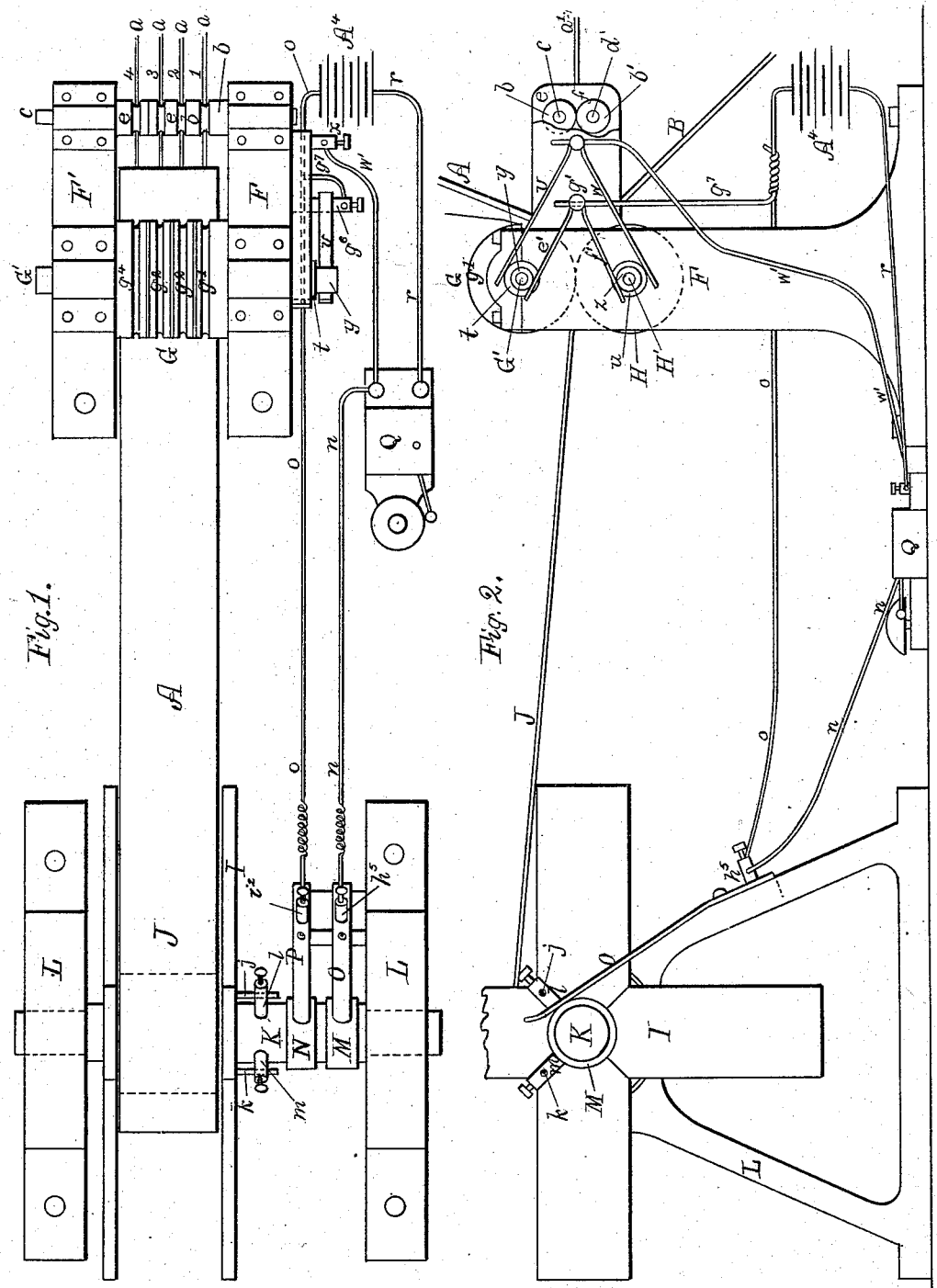
Witnesses.
F. G. Simpson
H. E. Lodge
Inventor.
Louis Finger.
F. Curtis, Atty.

(No Model.) 3 Sheets—Sheet 2.
L. FINGER.
ALARM FOR DETECTING DEFECTS IN INSULATING CONDUCTORS.
No. 257,683. Patented May 9, 1882.
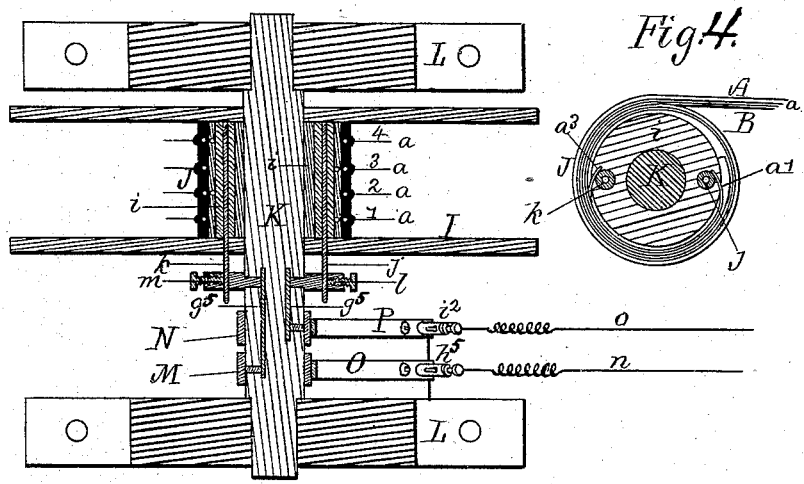
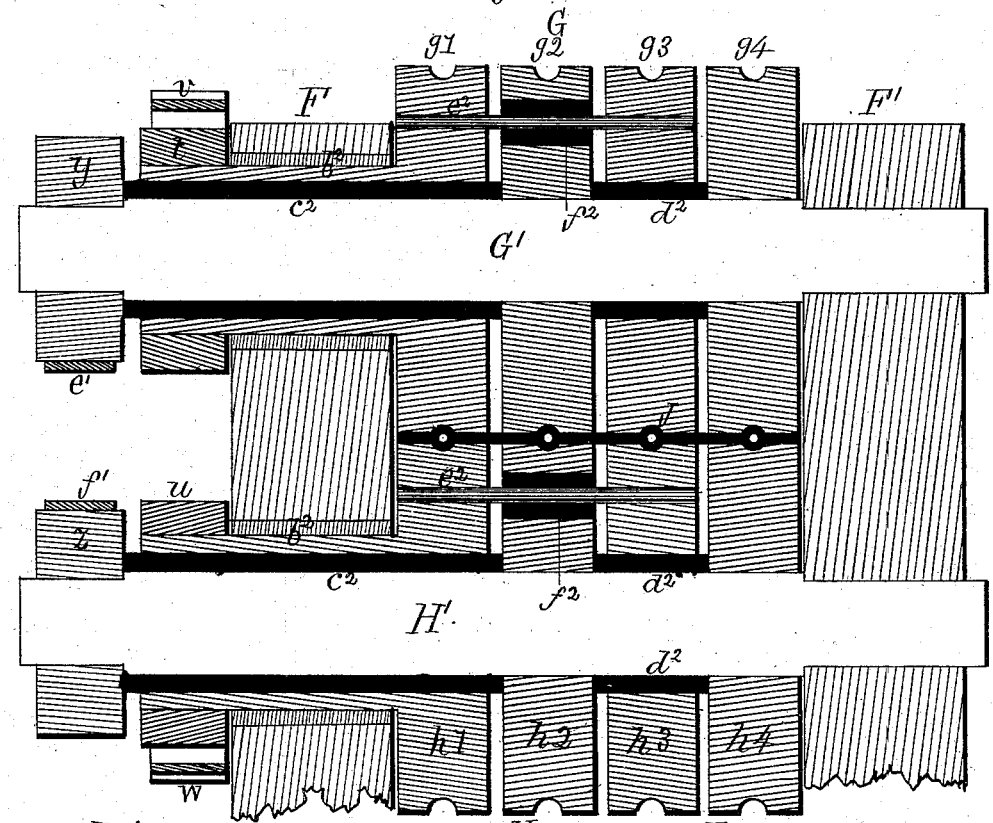
Witnesses.
H. E. Lodge
F. G. Simpson
Inventor.
Louis Finger.
H. Curtis. Atty.

(No Model.) 3 Sheets—Sheet 3.
L. FINGER.
ALARM FOR DETECTING DEFECTS IN INSULATING CONDUCTORS.
No. 257,683. Patented May 9, 1882.
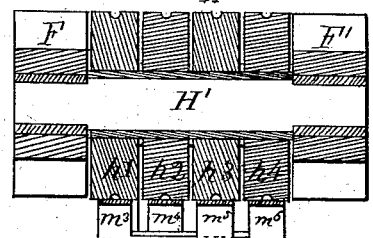
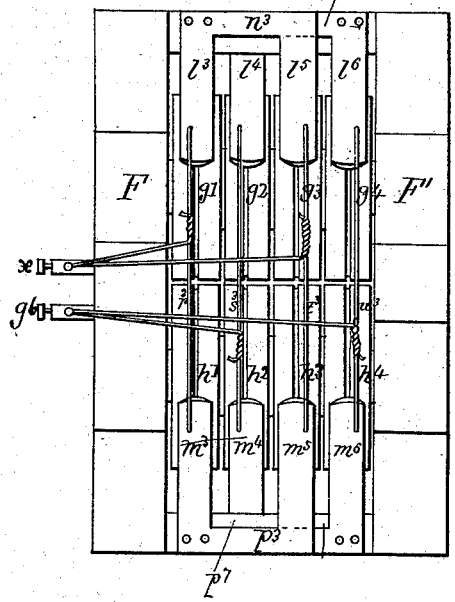
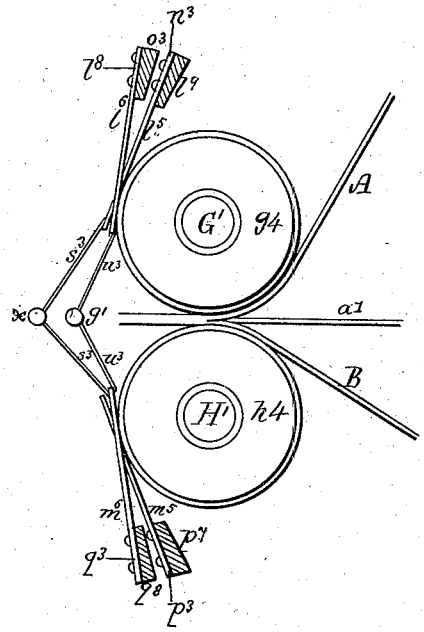
Witnesses.
F. G. Simpson
H. E. Lodge
Inventor.
Louis Finger,
F. Curtis, Atty.

UNITED STATES PATENT OFFICE.

LOUIS FINGER, OF MELROSE, ASSIGNOR OF ONE-HALF TO LEWIS S. JUDD, OF NEW BEDFORD, MASSACHUSETTS.

ALARM FOR DETECTING DEFECTS IN INSULATING CONDUCTORS.

SPECIFICATION forming part of Letters Patent No. 257,683, dated May 9, 1882.

Application filed September 28, 1881. (No model.)

*To all whom it may concern:*

Be it known that I, LOUIS FINGER, a citizen of the United States, residing at Melrose, in the county of Middlesex and State of Massachusetts, have invented certain new and useful Improvements in Automatic Alarms for Detecting Defects in Insulated Wire Belts or Cables; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention is an accessory to machinery for manufacturing a class of insulated telegraph or telephone or kindred wires or cables, which are composed of a cluster of wires embedded or enveloped in a compound of rubber or other insulating material, and insulated from each other by such material, the purpose of my invention being to provide such machinery with a device or apparatus which shall automatically give notice of the inclosing in the insulating envelope of two or more wires which may accidentally get in contact or electric connection prior to or while being inclosed, as well as to give like notice upon stripping of the insulating material from one or more wires in any given spot; and I carry out my object by alternately polarizing the wires by connecting their front ends, as they are about to be run upon the reel in the completed cable, alternately to opposite poles of a battery, and I polarize the compressing-rolls in pairs by suitable connections with the same battery, but to poles of the latter opposite those to which the wires passing between said pairs of rolls are connected, as it is necessary to the operation of my invention that the wires shall be of opposite polarity to the rolls through which they pass, the whole being so arranged that upon accidental electric union of two or more of the telegraph-wires, or the stripping of a portion of any one of them, an electric circuit is closed and the bell rung, thus giving a signal which shall enable the attendant to detect and correct the evil before the wires become embedded to any extent in the insulating material, or before the exposed wires pass on and are stored upon the reel, without detection.

Telegraph or kindred wires or cables for underground and other service are now made to a considerable extent by inclosing a cluster of single wires within a mass of rubber compound or other suitable insulating material, the mode of manufacturing these insulated wires or cables which I have selected in the present instance to illustrate the application of my invention being to employ two continuous bands or strips of the suitable insulating material, secured together at one end and wound upon a reel together, with the wires inclosed between them, and the whole bound together by the adhesion or incorporation of the two bands, the wires being stored upon a suitable spool or drum, and introduced between the bands as the latter pass through the compressing-rolls. In the manufacture of this class of wires or cables it often occurs that two or more adjacent wires become connected while being buried or inclosed in the insulating-envelope, and when put to use the cable is impaired, and this evil is not detected until too late to remedy it at the proper time. Again, the insulating-covering may become stripped in places from the wires in passing the compressing-rolls, thereby exposing the wires to corrosion and destruction when laid.

My invention is intended to obviate these objectionable results by the employment, in combination with the machine which effects the enveloping of the wires, of a device or apparatus which shall operate automatically, by the establishment of an electric circuit, to give an alarm when two or more wires come in contact, or are stripped of any portion of the insulating-covering, thereby giving the attendant of the machine notice that something is wrong.

The drawings accompanying this specification represent, in Figure 1, a plan view of a machine provided with my invention; Fig. 2, a side elevation of the same. Fig. 3 is a horizontal section taken through the hub and shaft of the storing-reel. Fig. 4 is a cross-section of said shaft and its electric connections. Fig.

5 is a vertical section of the compressing-rolls. Fig. 6 is a horizontal section. Fig. 7 is a rear view, and Fig. 8 a vertical section, of a modified construction of the compressing-rolls and their adjuncts.

Reference being had to the above-named drawings, it will be seen that A B represent two bands of insulating material as leading from the reels containing them, and entering between the series of peripherally-grooved compressing-rollers $g'$ $g^2$ $g^3$ $g^4$, to be hereinafter explained, the rollers being supported in the tops of upright standards or housings F F', erected upon the floor of the apartment containing the machine.

In the present instance I have shown a cluster of parallel wires, four in number, arranged in a horizontal plane, and these wires are shown at $a$ $a$ $a$ $a$, and are led from a drum or series of spools of non-conducting material to and through a series, $b$ $b'$, of peripherally-grooved rolls mounted one over the other up-on horizontal shafts $c$ $d$, supported in the upper front part of the housings F F', such rolls being of any suitable insulating material to prevent electric connection with the wires passing between them.

G H in the drawings represent the two series of peripherally-grooved compressing-rolls before alluded to, these rolls being mounted upon horizontal shafts G' H' of active conducting metal supported in the upper parts of the standards F F in rear of the series of guide-rolls $b$ $b'$, and serving to compress the insulating-bands together and confine the wires between them, the peripheral grooves of the rolls permitting of the passage of the wires.

I represents a reel upon which the completed wire or cable is stored, while J represents such completed wire or cable, the shaft of the reel I being shown at K as mounted horizontally in upright standards L L, erected upon the floor of the machine in rear of the standards F F', and these standards L L must be insulated.

In order the more clearly to illustrate the operation of my apparatus, I have shown the individual rolls of the series $b$ at $e$ $e$ $e$ $e$, of the series $b'$ at $f$ $f$ $f$ $f$, of the series G at $g'$ $g^2$ $g^3$ $g^4$, and of the series H at $h'$ $h^2$ $h^3$ $h^4$, each of the rolls $e$ $f$ being peripherally grooved to guide the wires and deliver them in proper order to the compressing-rolls, the said rolls $e f$ being, as before stated, of an insulating material.

The object of using feed-rolls of insulating material is to prevent the closing of the circuit at this point.

Each alternate roll (1 and 3 and 2 and 4) of the series G H is of like polarity, and each roll is insulated from its neighbor on the same shaft, and the rolls of the same polarity in each series are connected with one pole of a battery.

Each roll of the series G H is of like polarity with the one above or below it, and each pair is of different polarity with the wire passing between them.

In Fig. 5 of the drawings I have shown one method of mounting and connecting the rolls $g$ $h$. In this figure each roll No. 1 has a tubular hub, $b^2$, which is insulated from the standards F F', and is supported and revolves in the upper part of the standard F, and this hub and the roll are insulated from the shaft by a bushing, $c^2$, of any suitable insulating material inserted between the two, this bushing also serving to insulate the rolls No. 2 from said rolls No. 1.

The rolls numbered $g^2$ $h^2$ $g^4$ $h^4$ are secured fast directly to their respective shafts, and are in electric connection by such shaft, which is an active conductor, but are insulated from rolls $g^3$ $h^3$ by a bushing, $d^2$, inserted in the bore of each of these rolls $g^3$ $h^3$, and encircling the shaft, such bushing extending beyond the ends of the rolls $g^3$ $h^3$ and meeting the rolls $g^2$ $h^2$ $g^4$ $h^4$, and serving also to insulate the rolls $g^3$ $h^3$ from their respective shafts.

The electric connection between the rolls $g'$ $g^3$ $h'$ $h^3$ of each series, which are insulated from the shaft, is by means of a rod, $e^2$, of good conducting metal, uniting said rolls $g'$ $g^3$ and $h'$ $h^3$ and passing through the rolls $g^2$ $h^2$, and insulated from the latter by a bushing, $f^2$, of insulating material. Proceeding, I secure to the hub or drum $i$ of the reel I two metallic conducting-rods, $j$ $k$, which extend outside of the said hub $i$ and through pole-cups $l$ $m$, secured to the shaft K of said reel.

M N in the drawings represent two flat rings or endless bands of effective conducting material encircling and rotating with the shaft K of the reel I, and connecting with the pole-cups $l$ $m$ by wires $g^5$, inserted within the shaft K, while in connection with these endless conductors M N, I employ two plate-springs, O P, also of conducting metal, and which are secured at their bases to the standard L with their free ends in contact with the said conductors M N. The plate or conductor O is connected by a pole-cup, $h^5$, with one end of a wire, $n$, and conductor P by a pole-cup, $i^2$, with one end of a wire, $o$. The wire $n$ leads to and connects at its opposite end with an electric bell, Q, while the wire $o$ connects at its opposite end with one pole of a battery, $A^4$. The opposite pole of the battery $A^4$ connects with the bell above named by a wire, $r$.

Previous to beginning the storing of the completed wire or cable upon the reel I, I secure or connect each alternate wire $a$ to one pole-cup, $k$, and the intermediate wires to the opposite pole-cup, $l$, (see Figs. 4 and 5,) it being essential that the connection of the respective wires with the poles of the battery shall be such that the polarity of any given wire shall be the opposite of that of the pair of rolls $g$ $h$, through which such wire passes, in order, as before stated, to avoid electric connection between such rolls and wires.

In the present instance wires Nos. 1 and 3 connect with the rod or pole $j$, pole-cup $l$, conductors N P, and battery-wire $o$, while wires Nos. 2 and 4 connect with the pole or rod $k$, pole-cup $m$, conductors M O, and bell-wire $n$. As a sequence, the rod or pole $j$ connects with the pole-cup $l$, conductors N P, and wire $o$, and the pole $k$ with cup $m$, conductors M O, and wire $n$. (See Fig. 6 of the drawings.)

Under the above-described arrangement of parts, if any of two adjacent wires $a$ become accidentally connected (which is often the case by a sliver from one touching the other, or one wire being bent and getting access to another) as they are being inclosed between the bands B C of insulating material in their passage between the series G H of compressing-rolls, an electric circuit in which the bell Q is included is instantly closed and the bell rung. For instance, if wire 1 get in contact with wire 2 (of opposite polarity) a circuit is closed, for the reason that the wire 1, as before stated, connects with one pole of the battery by way of the rod or pole $j$, cup $l$, conductors N P, and wire $o$, while wire 2 connects, by way of the pole or rod $k$, cup $m$, conductors M O and wire $n$, with the bell, while the bell, in turn, is connected with the opposite pole of the battery by the wire $r$, as before stated, thus closing the circuit and ringing the bell, and this ringing will continue until the machine-winder separates and properly rearranges the wires.

Thus far I have described my invention as adapted to sound an alarm in the event of two or more wires getting accidentally fouled while being inclosed in the insulating-bands. As it may happen that one or both of these bands become torn in passing between the compressing-rolls, and thereby expose one or more of the wires, I have adapted my apparatus to sound an alarm at this juncture, and I carry out this feature of my invention as follows:

To the outer end of the hub $b^2$ of each roll $g'$ $h'$, I secure a circular hub, $t$ or $u$, of conducting metal, and in connection with these hubs I employ two plate-springs or conductors, $v$ $w$, which are insulated from the housing F, and are mounted at their bases to a common pole-cup, $x$, which is secured to the said housing F and connects by a wire, $w'$, with the electric bell Q, while the free ends of the conductors $v$ $w$ rest respectively in contact with the peripheries of the hubs $t$ $u$. Continuing, I secure to the front end of each shaft G' H', as it protrudes beyond the hub $t$ or $u$, a circular hub, $y$ or $z$, of conducting metal, and in connection therewith I employ a second pair, $e'$ $f'$, of plate-spring conductors, which are secured at their bases to a pole-cup, $g^6$, insulated from the housing F and also secured to it, and connected with one pole of the battery by a wire, $g^7$, joining the wire $o$, before named, the free ends of the conductors $e'$ $f'$ bearing respectively upon the peripheries of the hubs $y$ $z$.

Hubs $t$ $u$ are of the same polarity as and are in electric connection with the rolls $g'$ $g^3$ $h'$ $h^3$ and wires $a^2$ $a^4$, while the hubs $y$ $z$ are in connection with and of the same polarity as the rolls $g^2$ $g^4$ $h^2$ $h^4$ and wires $a'$ $a^3$. Hence the hubs $t$ $u$, rolls $g'$ $g^3$ and $h'$ $h^3$, and wires $a^2$ $a^4$ are in connection with the bell, and the hubs $y$ $z$, rolls $g^2$ $g^4$ $h^2$ $h^4$, wires $a'$ $a^3$ with one pole of the battery. Under these circumstances, if wire $a'$ $a^3$, which is in connection with the battery, as before explained, becomes exposed while passing the rolls $g'$ $g^3$ $h'$ $h^3$, an electric circuit is closed at once by way of said wire $a'$ or $a^3$, rolls $g'$ or $g^3$, $h'$ or $h^3$, hubs $t$ $u$, conductors $v$ $w$, pole-cup $x$, and wire $w'$ to the bell and from the bell by wire $r$ to that pole of the battery opposite the pole connected with the wire $a'$, the bell being thereby sounded and continuing to sound until the machine is stopped and the fractured insulation repaired.

In order that the apparatus shall be very sensitive in detecting the connection between the wires or the exposure of one or more wires and instantaneous in sounding the alarm, I propose to include in the electric circuit a galvanometer which possesses a coil of large resistance.

In lieu of mounting the series G H of rolls upon their shafts and securing the dual spring-plate conductors $v$ $w$ $e'$ $f'$ to pole-cups secured to the housing F and bearing upon the peripheries of the hubs $t$ $u$ $y$ $z$, as explained, the entire series of compressing-rolls may be insulated from their shafts and from each other and the spring-plate conductors placed over and below such rolls and supported upon bars spanning the housings. In this case (see Figs. 7, 8, and 9 of the drawings) two pairs, $l^3$ $l^4$ $l^5$ $l^6$, of plate-springs are combined with the upper compressing-rolls, $g$, and two similar pairs of plate-springs, $m^3$ $m^4$ $m^5$ $m^6$, with the lower of such rolls, $h$. The springs $l^3$ $l^5$ bear upon the rolls $g'$ $g^3$ and the springs $l^4$ $l^6$ upon the rolls $g^2$ $g^4$. The springs $m^3$ $m^5$ bear upon the rolls $h'$ $h^3$ and the springs $m^4$ $m^6$ upon the rolls $h^2$ $h^4$. The springs $l^3$ $l^5$ are united at their bases by a plate, $n^3$, of which they constitute a part, and the springs $l^4$ $l^6$ by a similar plate, $l^8$. The plate $n^3$ is supported by a horizontal bar, $l^9$, spanning the housings F F', and the plate $l^8$ by a similar bar, $o^3$. The springs $m^3$ $m^5$ are united at their bases by a plate, $p^3$, of which they constitute a part, and the springs $m^4$ $m^6$ by a similar plate, $q^3$. The plate $p^3$ is supported upon a horizontal bar, $p^7$, spanning the housings F F', and the plate $q^3$ by a similar bar, $q^8$. The springs $l^3$ $l^5$ are connected with the springs $m^3$ $m^5$ by wires $r^3$ $s^3$ to make electric connection, and the springs $l^4$ $l^6$ are connected with the springs $m^4$ $m^6$ by wires $t^3$ $u^3$ for the same purpose. The wire $r^3$ or $s^3$ is connected with the pole-cup $x$, and the wire $t^3$ or $u^3$ with the pole-cup $g^6$. This arrangement is more simple in construction and direct in operation than that before described.

I claim—

1. In combination with machinery for coiling wires into a cable and the wires operated on thereby, a battery, a signal, and electric connections between said signal and battery and between these latter parts, respectively, and the alternate wires aforesaid, whereby the contact of two of these wires completes the circuit and operates the signal, substantially as set forth.

2. The combination of a battery with compressing-rolls electrically connected to one of its poles, an insulated wire electrically connected to its other pole, and a signal forming part of the circuit, whereby the contact of said wire with said rolls consequent on the uncovering of said wire will operate said signal, substantially as set forth.

3. The series G H of rolls, in combination with a battery and wires passing between the rolls, each wire being of different polarity from the rolls between which it passes, and the alternate rolls on the same shaft being of the same polarity.

4. In combination with the wires a and i and a battery and signal, the reel I, supporting said wires a at one end and making a part of the electric circuit, substantially as set forth.

5. In combination with the series G H of rolls, the wires a, the reel I, the battery and wires to constitute an electric circuit, and the bell or signal Q, substantially as set forth.

6. The wires a, polarized alternately in pairs of opposite polarity and connected at one end with the reel I, in combination with said reel, the battery, wires i, and electrical connections, substantially as set forth.

7. In combination with a battery, a signal and cable-wires electrically connected to said battery, the rolls forming series G H, each roll being insulated from the roll nearest it, each alternate roll being insulated from its shaft, and said rolls being polarized alternately, substantially as set forth.

8. In combination with wires a and the battery, signal, and electrical connections, a pair of shafts and the rolls thereon, each shaft being connected to the pole of a battery and serving the purpose of polarizing the rolls, substantially as set forth.

In testimony whereof I affix my signature in presence of two witnesses.

LOUIS FINGER.

Witnesses:
H. E. LODGE,
F. G. SIMPS